United States Patent
Delos Ayllon et al.

(10) Patent No.: US 10,143,046 B2
(45) Date of Patent: Nov. 27, 2018

(54) LIGHT EMITTING DIODE DRIVER WITH DIFFERENTIAL VOLTAGE SUPPLY

(71) Applicant: PHILIPS LIGHTING HOLDING B.V., Eindhoven (NL)

(72) Inventors: Julia Delos Ayllon, Eindhoven (NL); Toni Lopez, Aachen (DE); Machiel Antonius Martinus Hendrix, Budel-Dorplein (NL); Eduardo-Jose Alarcon-Cot, Sant Cugat del Valles-Barcelona (ES)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/442,434

(22) PCT Filed: Sep. 4, 2014

(86) PCT No.: PCT/IB2014/064243
§ 371 (c)(1),
(2) Date: May 13, 2015

(87) PCT Pub. No.: WO2015/040519
PCT Pub. Date: Mar. 26, 2015

(65) Prior Publication Data
US 2016/0242243 A1 Aug. 18, 2016

(30) Foreign Application Priority Data
Sep. 19, 2013 (EP) ..................... 13185187

(51) Int. Cl.
*H05B 33/08* (2006.01)
*H02M 3/07* (2006.01)
*H02M 1/00* (2006.01)

(52) U.S. Cl.
CPC .......... *H05B 33/0806* (2013.01); *H02M 3/07* (2013.01); *H05B 33/0815* (2013.01);
(Continued)

(58) Field of Classification Search
None
See application file for complete search history.

(56) References Cited

U.S. PATENT DOCUMENTS 6,057,777 A * 5/2000 Dunne .................... B66C 13/46
212/276
7,511,977 B2   3/2009 Oyama et al.
(Continued)

FOREIGN PATENT DOCUMENTS

EP    2515614 A2    10/2012
JP    2005124392 A    5/2005
(Continued)

OTHER PUBLICATIONS

Analog Devices; "Charge-Pump, Parallel Backlight Driver With Image Content PWM Input", Data Sheet ADP8870, 2012 Analog Devices, Inc., www.analog.com, pp. 1-60.
(Continued)

*Primary Examiner* — Crystal L Hammond
(74) *Attorney, Agent, or Firm* — Akarsh P. Belagodu

(57) ABSTRACT

The current invention relates to a driver for driving one or a plurality of LEDs (D1, D2), comprising at least one driving unit (201, 202) adapted to be supplied with a differential voltage, between one first bias voltage (VB1) and one second bias voltage (VB2), the differential voltage being adapted to be equal or larger than the largest expected variations (ΔVF) of the forward voltage of said one or a plurality of LEDs (D1, D2). Another aspect of the invention relates to an integrated package comprising at least an LED and associated driving unit (201, 202). Another aspect of the
(Continued)

invention relates to a light module comprising a plurality of LEDs (D1, D2) and associated driving units (201, 202).

17 Claims, 4 Drawing Sheets

(52) U.S. Cl.
CPC ..... *H05B 33/0818* (2013.01); *H05B 33/0845* (2013.01); *H02M 2001/0077* (2013.01); *H02M 2003/072* (2013.01)

(56) References Cited

U.S. PATENT DOCUMENTS

| | | | | |
|---|---|---|---|---|
| 8,093,825 B1* | 1/2012 | Van Ess | | H05B 33/0818 315/291 |
| 8,121,160 B2 | 2/2012 | Moto et al. | | |
| 8,531,164 B2* | 9/2013 | D'Angelo | | H05B 33/0815 323/266 |
| 8,724,353 B1* | 5/2014 | Giuliano | | H02M 3/07 327/536 |
| 8,947,007 B2 | 2/2015 | Zudrell-Koch | | H05B 33/0815 315/186 |
| 9,288,861 B2* | 3/2016 | Williams | | |
| 9,374,857 B2* | 6/2016 | McRae | | H05B 33/0809 |
| 9,429,965 B2* | 8/2016 | D'Angelo | | G05F 1/461 |
| 2003/0072154 A1* | 4/2003 | Moore | | F21S 10/04 362/234 |
| 2007/0176726 A1* | 8/2007 | Xu | | H02M 3/1584 336/229 |
| 2007/0273306 A1* | 11/2007 | Fujino | | H05B 33/0815 315/312 |
| 2009/0230874 A1* | 9/2009 | Zhao | | H05B 33/0827 315/192 |
| 2009/0289559 A1* | 11/2009 | Tanaka | | H05B 33/0827 315/185 R |
| 2010/0019681 A1* | 1/2010 | Deixler | | H05B 33/0818 315/185 R |
| 2010/0066257 A1* | 3/2010 | Lin | | H05B 33/0827 315/161 |
| 2010/0264836 A1* | 10/2010 | Godbole | | H05B 33/0815 315/185 R |
| 2011/0057569 A1* | 3/2011 | Wei | | H05B 33/083 315/122 |
| 2011/0095704 A1 | 4/2011 | Moussakov et al. | | |
| 2011/0102069 A1 | 5/2011 | Tsai et al. | | |
| 2011/0109251 A1* | 5/2011 | Takeuchi | | G09G 3/3406 315/320 |
| 2012/0081022 A1* | 4/2012 | Moussakov | | H05B 33/0824 315/240 |
| 2012/0139423 A1* | 6/2012 | Angelin | | H05B 37/00 315/127 |
| 2012/0153856 A1* | 6/2012 | Liu | | H05B 33/0809 315/219 |
| 2012/0248998 A1* | 10/2012 | Yoshinaga | | H05B 33/0815 315/193 |
| 2013/0113385 A1* | 5/2013 | Bosmuller | | H05B 37/02 315/161 |
| 2014/0001975 A1* | 1/2014 | Lee | | H05B 33/0851 315/224 |
| 2014/0049174 A1* | 2/2014 | Radermacher | | H05B 33/0821 315/200 R |
| 2014/0111101 A1* | 4/2014 | McRae | | H05B 33/0806 315/186 |
| 2014/0111179 A1* | 4/2014 | Couleur | | H02M 3/1584 323/312 |
| 2014/0191249 A1* | 7/2014 | Blanchard | | H01L 27/153 257/77 |
| 2014/0361696 A1* | 12/2014 | Siessegger | | H05B 33/0803 315/186 |
| 2014/0375214 A1* | 12/2014 | Vos | | H05B 33/0824 315/122 |

FOREIGN PATENT DOCUMENTS

| | | |
|---|---|---|
| JP | 2006353007 A | 12/2006 |
| JP | 2007318879 A | 12/2007 |
| WO | 2005011006 A1 | 2/2005 |
| WO | 2009019634 A1 | 2/2009 |
| WO | 2013086445 A1 | 6/2013 |

OTHER PUBLICATIONS

Maxim; "Charge Pump for Backlight/Flash/RGB LEDs With Safety Timer", MAX8879, www.maxim-ic.com, pp. 1-16, 2008.
Microchip; "Low Noise, Positive-Regulated Charge Pump", MCP1252/3, 2002 Microchip Technology Inc., pp. 1-18.
Michael Douglas Seeman; "A Design Methodology for Switched-Capacitor DC-DC Converters", Electrical Engineering and Computer Sciences, Univ. of California at Berkeley, May 21, 2009, pp. 1-249.
Vincent Wai-Shan Ng et al; "Switched Capacitor DC-DC Converter: Superior Where the Buck Converter Has Dominated", Electrical Engineering and Computer Sciences, Univ. of California at Berkeley, Aug. 17, 2011, pp. 1-141.

* cited by examiner

LIGHT EMITTING DIODE DRIVER WITH DIFFERENTIAL VOLTAGE SUPPLY

CROSS-REFERENCE TO PRIOR APPLICATIONS

This application is the U.S. National Phase application under 35 U.S.C. § 371 of International Application No. PCT/IB14/064243, filed on Sep. 4, 2014, which claims the benefit of European Patent Application No. 13185187.5, filed on Sep. 19, 2013. These applications are hereby incorporated by reference herein.

TECHNICAL FIELD

The current invention relates to the field of drive circuits for Light Emitting Diode (LED) light sources, and more particularly to Alternating Current to Direct Current (AC-DC) or Direct Current to Direct Current (DC-DC) converters for LEDs.

BACKGROUND

An LED is typically driven by a driver circuit comprising an AC-DC or a DC-DC converter delivering at least one regulated output, allowing generating and supplying relatively constant currents—in response to varying input voltages or to any other disturbances, such as variations of the load impedance that may result from variations of temperature or ageing of the load.

The Solid State Lighting (SSL) Industry's demand for small and compact power management units for LEDs is increasing, which statement is even stronger in the field of Power LEDs, for which energy from the power supply has to be delivered in the form of a constant current as efficiently as possible. Ideally, LED drivers comparable in size to the LEDs themselves would represent a significant breakthrough enabling new lighting concepts. Such a solution will require a system with a high level of reliability and efficiency, in order to fit the requirements of life-time, size and heat dissipation.

Known LED drivers are generally currently based on two main technologies: Linear Drivers and Switched Mode Power Supplies (SMPS).

Linear Drivers for DC-DC conversion have the advantage of offering high integration capabilities at low cost, owned to the fact that such drivers may only consist of long latency semiconductor switches and resistors which can be monolithically integrated with mature technologies; on the other hand, solutions based on linear drivers can have a poor efficiency whenever the voltage difference between input and output becomes high, either due to design tolerances, or by disturbances in the system such as variations of the load impedance that may result from variations of temperature or ageing of the load, or both.

The Current-Voltage characteristics of LEDs, as illustrated in FIG. 1 described in detail hereinafter, behaves abruptly when the voltage reaches a certain forward voltage threshold, usually designated by VF. Variations on the forward voltage threshold, which can be designated by $\Delta VF$, for a given LED, are typically in the order of ±10% and therefore lead to significant power losses, which represent a challenge for the power management unit of an LED driver. In practice, linear drivers can only be used for sub-Watt applications.

SMPS drivers using inductive storage allow achieving better efficiencies; however the monolithic integration of all SMPS elements (in particular the reactive components, and more particularly inductors) is not yet mature enough to meet the requirements of the considered application.

SMPS drivers using capacitive energy storage—SMPS notably including Switched Capacitor Converters (SCC) or Charge Pumps (CP)—can provide highly efficient DC-to-DC voltage conversion with only the use of capacitors and semiconductor switches. Therefore capacitive-type SMPS can be more easily integrated compared to inductive-type SMPS. Using CPs in drivers for LEDs is known, and some available off-the-shelf integrated circuits include charge pumps. However all these products basically consist of a monolithic chip that integrates a CP powertrain and a linear regulator with the associated control, these products being broadly used in mobile phones backlighting, typically for powers up to one watt. In these solutions the input voltage, typically supplied by a Lithium-Ion battery, is first stepped-up or stepped-down to the closest voltage above the forward voltage of the LED. These chips provide current regulation by means of a linear driver, which in most cases translates to poor efficiencies, typically below 80%.

There is no known solution for mid to high power LED drivers that provides a compromise between a small volume, typically equivalent to the volume of the LED itself, and minimized losses due to variations of the forward voltage of the LED.

SUMMARY

One aim of the present invention is to remedy to the above-mentioned shortcomings of the prior art, by proposing a solution allowing realizing low-volume drivers for LEDs, particularly adapted to be unaffected by variations of the LED forward voltage. The current invention further allows realizing a power management unit for an LED that can be easily integrated within the LED package.

According to the present invention, it is proposed that an LED driver be supplied with a floating differential voltage, defined by one first and one second bias voltage, the difference between the two bias voltages being equal or larger than the expected variation of the LED forward voltage. The small differential supply voltage relaxes the stress in the components of the driver and considerably reduces the complexity of its circuitry, particularly when such driver consists of a SCC.

For that purpose, the current invention proposes a driver for driving one or a plurality of LEDs, the driver comprising a driving unit adapted to be supplied with a differential voltage, between one first bias voltage and one second bias voltage, the differential voltage being adapted to be equal or larger than the largest expected variations of the forward voltage of said one or a plurality of LEDs.

In an exemplary embodiment of the invention, the driver can comprise a voltage converter adapted for supplying an output voltage, the time characteristics of which being substantially a square waveform, as a function of said differential voltage.

In an exemplary embodiment of the invention, said voltage converter can be formed by a switched capacitor converter.

In an exemplary embodiment of the invention, said voltage converter can be based on a Dickson ladder topology.

In an exemplary embodiment of the invention, said switched capacitor converter can comprise a plurality of internal nodes supplying intermediate voltages, and the driver can further comprise a multiplexer adapted to selectively connect the driver output voltage to either one of said internal nodes.

In an exemplary embodiment of the invention, the driver can comprise a voltage supply supplied by an input voltage and adapted to supply said two bias voltages.

In an exemplary embodiment of the invention, voltage supply can be adapted to vary the values of the two bias voltages as a function of the variations of at least one among the group consisting of temperature and lapsed time of operation of the LEDs.

In an exemplary embodiment of the invention, the voltage supply can be adapted to vary the value of each bias voltages by adding a determined offset value to the value of each bias voltage, the offset value being depending on estimated variations of at least one among the group consisting of temperature and lapsed time of operation of the LEDs.

In an exemplary embodiment of the invention, the voltage supply can comprise a step-down converter, the lower of said two bias voltages being supplied by the step-down converter.

In an exemplary embodiment of the invention, the step-down converter can be based on a Dickson ladder topology.

Another aspect of the current invention is an LED package comprising at least one LED and an associated driving unit, as per any of the described embodiments.

In an exemplary embodiment of the invention, the LED package can be integrated as a Power System on a Chip or as a Power System in a Package.

Yet another aspect of the current invention is a light module comprising a plurality of LEDs with substantially identical voltage-current characteristics, each LED being driven by a driving unit as per any of the described embodiments.

In an exemplary embodiment of the invention, the light module can further comprise a voltage supply supplied by an input voltage and adapted to supply said two bias voltages to the plurality of driving units.

Another aspect of the current invention is a method of operating at least one load comprising providing at least one driving unit adapted to be supplied with a differential voltage, between one first bias voltage and one second bias voltage, the differential voltage being adapted to be equal or larger than the largest expected variations of the forward voltage of said at least one load.

One other advantage of the current invention in some of its embodiments, is that the architecture of an LED driver or a driving unit as per any of the described embodiments can be simplified compared to existing architectures, notably in term of the number of required components. For instance, if the driver or driving unit comprises SCCs, then the number of switches and capacitors can be drastically reduced, compared to existing driver architectures based upon SCCs allowing achieving comparable power conversion ratios.

One other advantage of the current invention is that an LED driver, driving unit or an LED light module according to any of the described embodiments may be so power efficient that it does not require a heat sink or a low resistive thermal path.

BRIEF DESCRIPTION OF THE DRAWINGS

These and other characteristics and advantages of the invention will be made clearer in view of the detailed description given below of a preferred embodiment, provided by way of an illustrative and non-limiting example only, as well as the accompanying drawings which represent.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Figure 1:
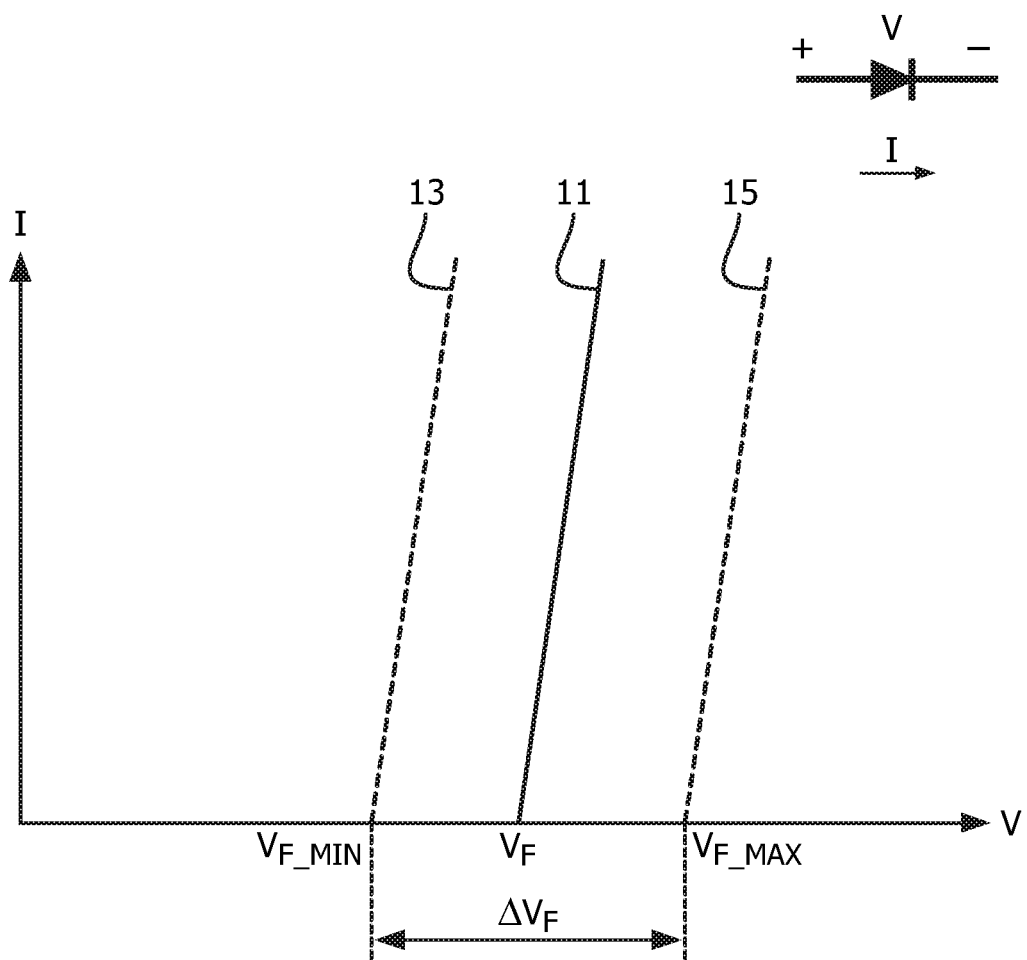
FIG. 1, a diagram illustrating typical current-voltage characteristics of an LED.

FIG. 1 shows a diagram illustrating typical current-voltage characteristics of an LED. FIG. 1 aims at supporting proper understanding of the current invention; notably the relative values of the variations of the forward voltage and a nominal forward voltage are purely illustrative and not necessarily corresponding in case with actual practical characteristics of an LED.

FIG. 1 plots one first curve 11, drawn in solid line, representing nominal voltage—current characteristics of a diode in the forward region, that is, a graph wherein ordinates indicate the intensity I of the current flowing through the LED, in the direction from the anode to the cathode, and the abscissae indicate the voltage V across the LED. When the LED voltage V reaches a given forward voltage drop value VF, then the LED current I becomes appreciable and the LED presents a very low resistance. However, the nominal forward voltage VF for a given LED can slightly vary due to manufacturing variations; the forward voltage VF can also significantly vary in operation due to the variations of the current through the load, but also due to variations in environmental parameters such as temperature; it can also vary significantly as a result of ageing of the LED. The largest expected variations of the forward voltage of an LED, taking into account all possible source causes as mentioned above, can be considered to be in an interval between a minimum forward voltage VFmin and a maximum forward voltage VFmax, the length of this interval being denoted as $\Delta$VF. The V-I characteristics of the LED under the extreme conditions for which the forward voltage is minimum or maximum are drawn in dotted lines, respectively as a second curve 13 and a third curve 15. The overall shapes of the second and third curves 13, 15 are similar to the shape of first curve 11.

Figure 2:
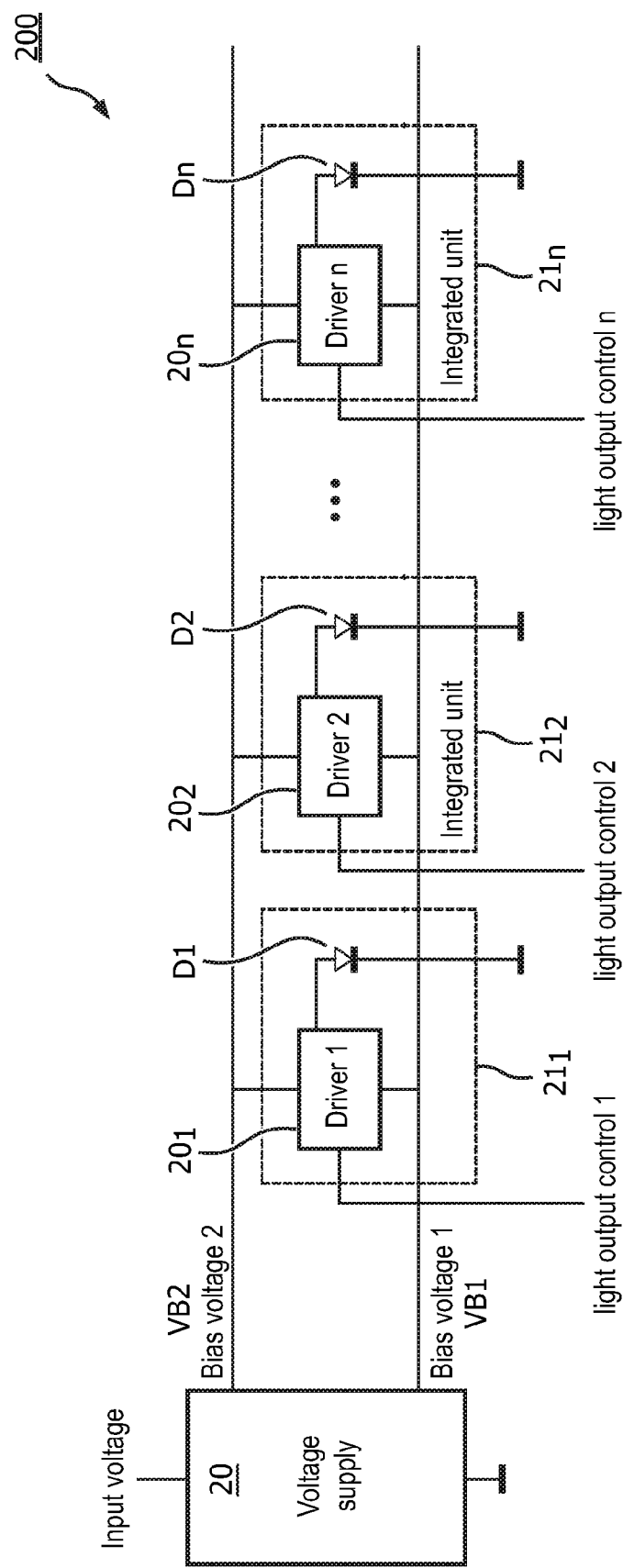
FIG. 2, a block diagram illustrating the architecture of a light module comprising a plurality of LEDs and LED driving units according to the present invention.

FIG. 2 presents a block diagram illustrating the architecture of a light module 200 comprising a plurality of LEDs and driving units according to the present invention.

The light module 200 comprises a plurality n of LEDs D1, D2, ..., Dn, n being a non-null integer. Each LED D1, D2, ..., Dn is driven by a driving unit 201, 202, ..., 20n. In an exemplary embodiment, one single power supply 20, supplied with an input voltage Vin, can supply all driving units 201, 202, ..., 20n.

According to a specificity of the current invention, each LED driving unit 201, 202, ..., 20n can be supplied with a floating differential voltage, defined by a first bias voltage VB1 and a second bias voltage VB2. The difference between the two bias voltages VB1, VB2 can be chosen so as to be equal or larger than the expected maximum variation of the LED forward voltage ΔVF, taking into account all possible source causes as described above. In alternative, the difference between the two bias voltages VB1, VB2 can be chosen so as to be equal or larger than the expected maximum variation of the LED forward voltage, when only those variations that are due to the variations of the current through the load in operation are taken into account, which variations being linked to the dynamic resistance of the LED. In such a configuration, the variations of the forward voltage that are due to other source causes such as variations in temperature or ageing of the load, can be compensated through optimizing the load operation by adjusting the absolute values of the two bias voltages VB1, VB2, for example while keeping the differential voltage between the two bias voltages VB1, VB2 constant, as described further in detail below.

The small differential supply voltage allows relaxing the stress in the components of the driver and considerably reduces the complexity of its circuitry. Thus, each LED D1, D2, ..., Dn can be integrated in an LED package with its associated driving unit 201, 202, ..., 20n, in an integrated unit 211, 212, ..., 21n, the integrated units 211, 212, ..., 21n being represented in dotted lines in the figure.

Each driving unit 201, 202, ..., 20n comprises one first supply terminal connected to the first bias voltage VB1, one second supply terminal connected to the second bias voltage VB2, at least one output terminal connected to the anode of the corresponding LED D1, D2, ..., Dn, the cathode of the LED being connected to a reference voltage, for example to the ground. Each LED driving unit 201, 202, ..., 20n can further comprise an input terminal for receiving a light output control signal, allowing to adjust light intensity and/or other light parameters such as colour.

The LEDs D1, D2, ..., Dn have essentially similar characteristics, or at least their characteristics are such that their expected largest forward voltage variations are all within a determined interval that is fully comprised in the interval allowed by the two bias voltages with which their driving units are supplied.

Figure 3:
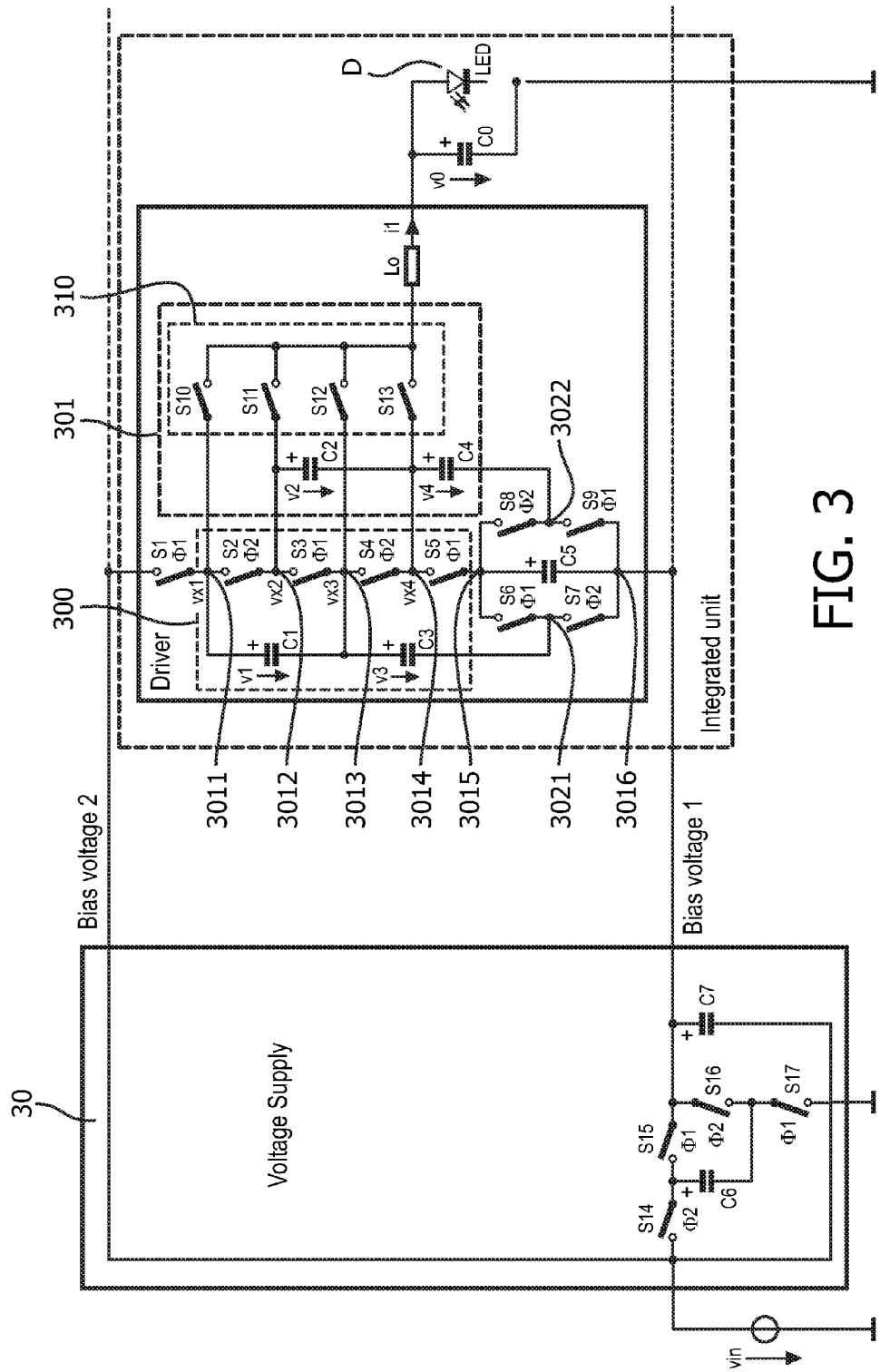
FIG. 3, a diagram illustrating a detailed structure of an LED driver according to an exemplary embodiment of the invention.

FIG. 3 shows a diagram illustrating a detailed structure of an LED driver according to an exemplary embodiment of the invention, with associated power supply.

According to a preferred embodiment of the present invention, an LED driver can comprise a driving unit 301. The driving unit 301 can comprise a voltage converter 300, for example a charge pump that can be based on a Switched Capacitor Converter (SCC), for example of the Ladder topology type. The driving unit 301 is supplied by a differential voltage through the two bias voltages VB1 and VB2 supplied by a power supply 30, which can be part of the LED driver or external to the LED driver.

In the exemplary embodiment illustrated by FIG. 3, the LED driving unit 301 comprises a so-called Dickson Ladder converter forming the voltage converter 300. It shall be observed that other SCC topologies can be used, such as standard ladder, Fibonacci, or series-parallel topologies for instance.

The illustrated exemplary embodiment uses a Dickson Ladder topology based on five capacitors C1 to C5 and nine switches S1 to S9 of the single pole, single throw type. More specifically, the driving unit 301 comprises two flying ladders, each flying ladder comprising two capacitors: one first flying ladder comprises one first capacitor C1 in series with one third capacitor C3, and one second flying ladder comprises one second capacitor C2 in series with one fourth capacitor C5.

The driving unit 301 further comprises six central nodes 3011 to 3016. One first switch S1 selectively connects the first central node 3011 to the second bias voltage VB2. One second switch S2 selectively connects the first central node 3011 to the second central node 3012. One third switch S3 selectively connects the second node 3012 to the third central node 3013. One fourth switch S4 selectively connects the third central node 3013 to the fourth central node 3014. One fifth switch S5 selectively connects the fourth central node 3014 to the fifth central node 3015. One fifth capacitor C5 is placed between the fifth central node 3015 and one sixth central node 3016. The sixth central node 3016 is connected to the first bias voltage VB1.

The first flying ladder comprising the first and third capacitors C1, C3 is located between the first central node 3011 and one first secondary node 3021. One sixth switch S6 selectively connects the first secondary node 3021 to the fifth central node 3015; one seventh switch S7 selectively connects the first secondary node 3021 to the sixth central node 3016. One node in-between first capacitor C1 and third capacitor C3 is connected to the third central node 3013.

The second flying ladder comprising the second and fourth capacitors C2, C4 is located between the second central node 3012 and one second secondary node 3022. One eighth switch S8 selectively connects the second secondary node 3022 to the fifth central node 3015; one ninth switch S9 selectively connects the second secondary node 3022 to the sixth central node 3016. One node in-between second capacitor C2 and fourth capacitor C4 is connected to the fourth central node 3014.

The two flying ladders are oppositely phased, thanks to an adequate sequence of opening and closing the switches S1 to S9. For example, all the odd-numbered switches S1, S3, ..., S9 can be in a given state during a first time phase Φ1, for instance turned on, while all the even-numbered switches S2, S4, ..., S8 are in the opposite state, for instance turned off; during a successive second time phase Φ2, the states of all the switches can be reversed.

For example, the voltage converter 300 can be configured so as to provide a conversion ratio of 5:1.

Figure 4A:
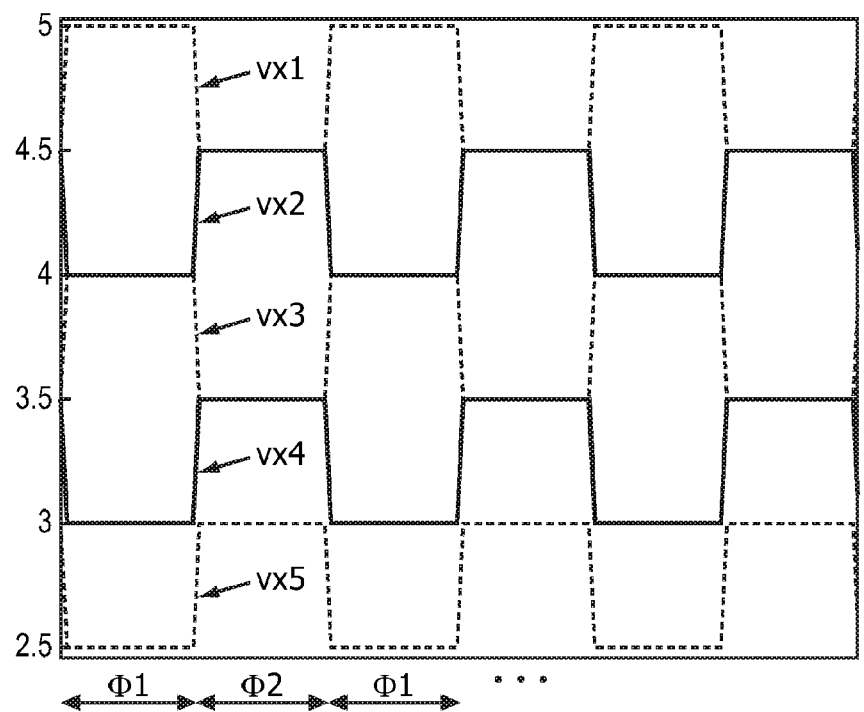
FIGS. 4A and 4B, time diagrams illustrating the operation principle of an LED driver according to an exemplary embodiment of the invention.
Figure 4B:
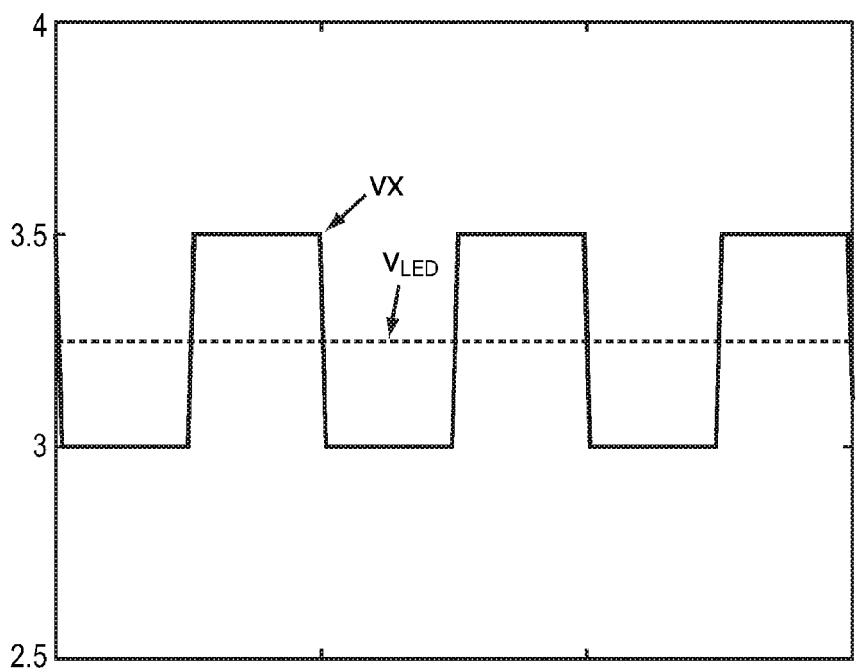

The driving unit 301 can further comprise one multiplexer 310 allowing selectively connecting one of the internal nodes of the voltage converter 300, that is: either one of the first four central nodes 3011, 3012, 3013, 3014, one at a time, outputting a driver voltage vx as a function of respective intermediate voltages vx1, vx2, vx3, vx4 at the first four central nodes 3011, 3012, 3013, 3014 respectively. Exemplary curves of the driver voltage vx and of the intermediate voltages vx1, vx2, vx3, vx4 as a function of time are shown in FIGS. 4A and 4B described hereinafter. The multiplexer can be formed by four multiplexer switches S10, S11, S12, S13 connected to the first four central nodes 3011, 3012, 3013, 3014 respectively.

One advantage brought by such an embodiment with multiplexer 310 is that the driving unit 301 can thus be adapted to driving LEDs with different characteristics, based on given bias voltages; therefore, using a multiplexer allows a larger dynamic range of the output voltage, or reciprocally of the input voltage.

The output of the multiplexer 310 can be connected to a filter inductor Lo put in series with the LED D. A capacitor Co can be put in parallel with the LED D. The output filter formed by the filter inductor Lo and the capacitor Co filters the internal pulsating voltages of the SCC, supplying a constant current to the LED D.

The voltage supply 30 can be supplied by an input voltage Vin, and can comprise a step-down converter. Thus, in an exemplary embodiment, the power supply 30 can deliver the first bias voltage VB1 resulting from the step-down conversion of the input voltage Vin, and the second bias voltage VB2 being equal to the input voltage Vin, such an embodiment having the advantage of requiring a simple architecture.

Yet in the exemplary embodiment illustrated by FIG. 3, the voltage supply 30 is implemented based on a Dickson Ladder architecture comprising two capacitors C6, C7 and four switches S14, S15, S16, S17, allowing the step-down conversion of the input voltage Vin. For example, the voltage supply 30 can be configured so as to allow a step-down conversion ratio of 2:1. If the input voltage Vin is equal to 5 V, then the voltage supply provides 5V and 2.5V respectively as the second bias voltage VB2 and first bias voltage VB1, for example through dedicated power rails.

Yet in the exemplary embodiment illustrated by FIG. 3, the voltage supply 30 is adapted to convert an input DC voltage into an output DC voltage. It shall be observed that the voltage supply 30 may for instance also be adapted to convert an AC input signal, such as an AC voltage or mains voltage. To that end, the voltage supply 30 can further comprise a rectifier or a rectifier and a transformer, not shown in the Figure.

As described above, in some embodiments of the invention, the difference between the two bias voltages VB1, VB2 can be chosen so as to be equal or larger than the expected maximum variation of the LED forward voltage, when only those variations that are due to the variations of the current through the load in operation are taken into account, which variations being linked to the dynamic resistance of the LED.

The voltage supply 30 can thus be adapted to optimize the load operation by varying the values of the bias voltages VB1, VB2 in order to compensate the variations of the forward voltage that are due to other source causes such as variations in temperature or ageing of the load.

For example, the voltage supply 30 can be adapted to vary the values of each bias voltage VB1, VB2 by adding or subtracting a determined offset value thereto, the offset value being determined as a function of the variations in temperature and/or ageing of the load.

For example, the driver can further comprise a controller unit that receives as inputs at least one among a signal representing a sensed temperature and a signal representing lapsed period of time of operation of the load. The controller can be part of the driver, or can be comprised by a component that is external to the driver.

The signal representing a sensed temperature can be provided by a temperature sensor, which similarly can be part of the driver or of some external component. The signal representing lapsed period of time of operation of the load can be provided by a time counter, which can similarly be part of the driver or of some external component.

The controller can then be adapted to determine how much the values of the two bias voltages shall be varied, for example based upon operational characteristics of the load, which can be comprised by look-up tables or mathematical functions, for example stored in a memory that can be part of the controller, of the driver or of some external component. Such operations characteristics of the load can be known in advance/They can for example be provided by a supplier of the load, or determined through characterizing the load behavior through carrying out appropriate tests.

In alternative embodiments, the controller can be adapted to determine the threshold voltage of the load, for example during a predetermined time window upon starting up the load operation, or at determined moments during the operation of the load. The threshold voltage of the load can for example be determined by applying an increasing output current through the load through successive steps, and collecting measured values of the resulting voltage across the load, according to methods that are known per se by a person of ordinary skill in the art.

For example, the voltage supply 30 and the LED driving unit 301 can be configured so as to operate with an input voltage Vin of 5 V with a ±10% tolerance, and with a load consisting of a middle power LED of 0.5 W with a nominal forward voltage threshold of 3 V, varying between 2.5 V to 3.5 V when considering the thermal and ageing drift. The circuit can thus be designed to provide a constant current of 150 mA for any deviation in the input voltage or LED forward voltage threshold.

All the switches S1 to S17 as in the illustrated exemplary embodiment can be bi-directional and implemented in a suitable technology that is compatible with the switching frequency of the circuit. For instance the switches can be formed by Metal Oxide Semiconductor Field Effect Transistors (MOSFET) on a silicon substrate or High Electron Mobility Transistors (HEMT) on a Gallium-Nitride substrate. Still in the exemplary embodiment illustrated by FIG. 3, the voltage converter 300 and the voltage supply 30 can operate at a frequency of 20 MHz, enabling integration of the reactive elements.

All the reactive elements can be sized small enough to enable integration, for example as a Power System on a Chip (PSoC) or Power System in a Package (PSiP). In the illustrated exemplary embodiment, the capacitance for all capacitors can be set to 100 nF; the capacitance values can be further optimized in order to achieve a better performance. The inductance value of the filter inductor Lo can be set to 200 nH, making it possible to be printed in an LED sub-mount with a surface of 5×5 mm.

In an alternative embodiment, the capacitors can be implemented using a technology similar to that applied to Ferroelectric Random Access Memory (FRAM) or embedded Dynamic Random Access Memory (eDRAM). The higher dielectric constant achieved with such technologies makes the integrated SCCs smaller and thus cheaper.

FIGS. 4A and 4B show time diagrams illustrating the operation principle of an LED driver according to an exemplary embodiment of the invention, of an LED driver and power supply having the exemplary specifications described above.

In reference to FIG. 4A, a graph plots 5 curves representing the intermediate voltage vxi as a function of time of corresponding central node I of the voltage converter 300, as described above, in an exemplary embodiment wherein voltage supply provides 5 V and 2.5 V respectively as the second bias voltage VB2 and first bias voltage VB1. All the curves in FIG. 4A have essentially the characteristics of a periodic square-wave, with a lower voltage level during phases Φ1 during which all the odd-numbered switches S1, S3, . . . , S9 are in a closed state and all even-numbered switches S2, S4, . . . are in an open state; and a higher voltage level during phases Φ1 during which all odd-numbered switches S1, S3, . . . are in an open state and all even-numbered switches S2, S4, . . . are in a closed state.

Now in reference to FIG. 4B, a graph plots a first curve, drawn in solid line, representing the time characteristics of the driver voltage vx, in an exemplary embodiment wherein the driver voltage vx is set equal to the voltage of the fourth intermediate voltage vx4, by closing the appropriate multiplexer switch S13 in an exemplary embodiment as described above in reference to FIG. 3, where the driver 301 comprises a multiplexer 310. In the illustrated example, the driver voltage vx therefore has the characteristics of a square wave, with a lower voltage level of 3 V, and a higher voltage level of 3.5 V.

The graph in FIG. 4B also plots a second curve, drawn in dotted line, representing the LED voltage VD across the LED D. Thanks to the output filter formed by the filter inductor Lo and the capacitor Co, the LED voltage VD is constant and equal to 3.25 V.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For example, the illustrated examples relate to using SCCs in drivers or voltage supply, but any other types of charge pumps or voltage converters based on SMPS architectures can be used in place of SCCs; also other architectures can be used, for instance linear drivers could be used with a differential supply voltage.

As another example, a voltage supply as described in the exemplary embodiments above, can be part of a power supply module, or can be integrated in a dedicated package, or possibly integrated in the same package as the driver and/or associated LED.

Yet as another example, an LED as per any of the described embodiments, could also be a set of LEDs, for example a string of LEDs.

All definitions, as defined and used herein, should be understood to control over dictionary definitions, definitions in documents incorporated by reference, and/or ordinary meanings of the defined terms.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed at limiting the scope.

The invention claimed is:

1. A Driver for driving one or more LEDs, the driver comprising:
   at least one driving unit configured to be supplied with a differential voltage comprising a first bias voltage and a second bias voltage, the first bias voltage and the second bias voltage being supplied concurrently, wherein the differential voltage is configured to be equal or larger than the largest expected variations of the forward voltage of said one or more LEDs.

2. The Driver as claimed in claim 1, comprising a voltage converter configured for supplying a driver output voltage (vx), the time characteristics of which being substantially a square waveform, as a function of said differential voltage.

3. The Driver as claimed in claim 2, wherein said voltage converter is formed by a switched capacitor converter.

4. The Driver as claimed in claim 3, wherein said voltage converter is based on a Dickson ladder topology.

5. The Driver as claimed in claim 3, wherein said switched capacitor converter comprises a plurality of internal nodes supplying intermediate voltages, the driver further comprising a multiplexer adapted to selectively connect the driver output voltage (vx) to either one of said internal nodes.

6. The Driver as claimed in claim 1, comprising a voltage supply supplied by an input voltage (Vin) and adapted to supply said two bias voltages.

7. The Driver as claimed in claim 6, wherein the voltage supply is adapted to vary the values two bias voltages as a function of the variations of at least one among the group consisting of temperature and lapsed time of operation of the LEDs.

8. The Driver as claimed in claim 7, wherein the voltage supply is adapted to vary the value of each bias voltages by adding a determined offset value to the value of each bias voltage, the offset value being depending on estimated variations of at least one among the group consisting of temperature and lapsed time of operation of the LEDs.

9. The Driver as claimed in claim 6, wherein the voltage supply comprises a step-down converter, the lower of said two bias voltages being supplied by the step-down converter.

10. The Driver as claimed in claim 9, wherein the step-down converter is based on a Dickson ladder topology.

11. A LED package comprising at least one LED and an associated driver, as claimed in claim 1.

12. The LED package as claimed in claim 11, integrated as a Power System on a Chip (PSoC) or Power System in a Package (PSiP).

13. A Light module comprising a plurality of LEDs with substantially identical voltage-current characteristics, each LED being driven by a driving unit of a plurality of driving units, respectively comprised as defined in claim 1.

14. The Light module as claimed in claim 13, further comprising a voltage supply supplied by an input voltage (Vin) and configured to supply said two bias voltages to the plurality of driving units.

15. Method of operating at least one load comprising:
   providing at least one driving unit;
   supplying the at least one driving unit with a differential voltage, comprising a first bias voltage and a second bias voltage, the first bias voltage and the second bias voltage being supplied concurrently, wherein the differential voltage is configured to be equal or larger than the largest expected variations of the forward voltage of said at least one load.

16. The Driver of claim 1, comprising a voltage converter configured for supplying a driver output voltage (vx), the value of the output voltage being between the first bias voltage and the second bias voltage.

17. The method of claim 15, further comprising the step of outputting a driver output voltage (vx), the value of the output voltage being between the first bias voltage and the second bias voltage.

* * * * *